(No Model.)
W. C. SHIPHERD.
Thill Coupling.
No. 231,455. Patented Aug. 24, 1880.
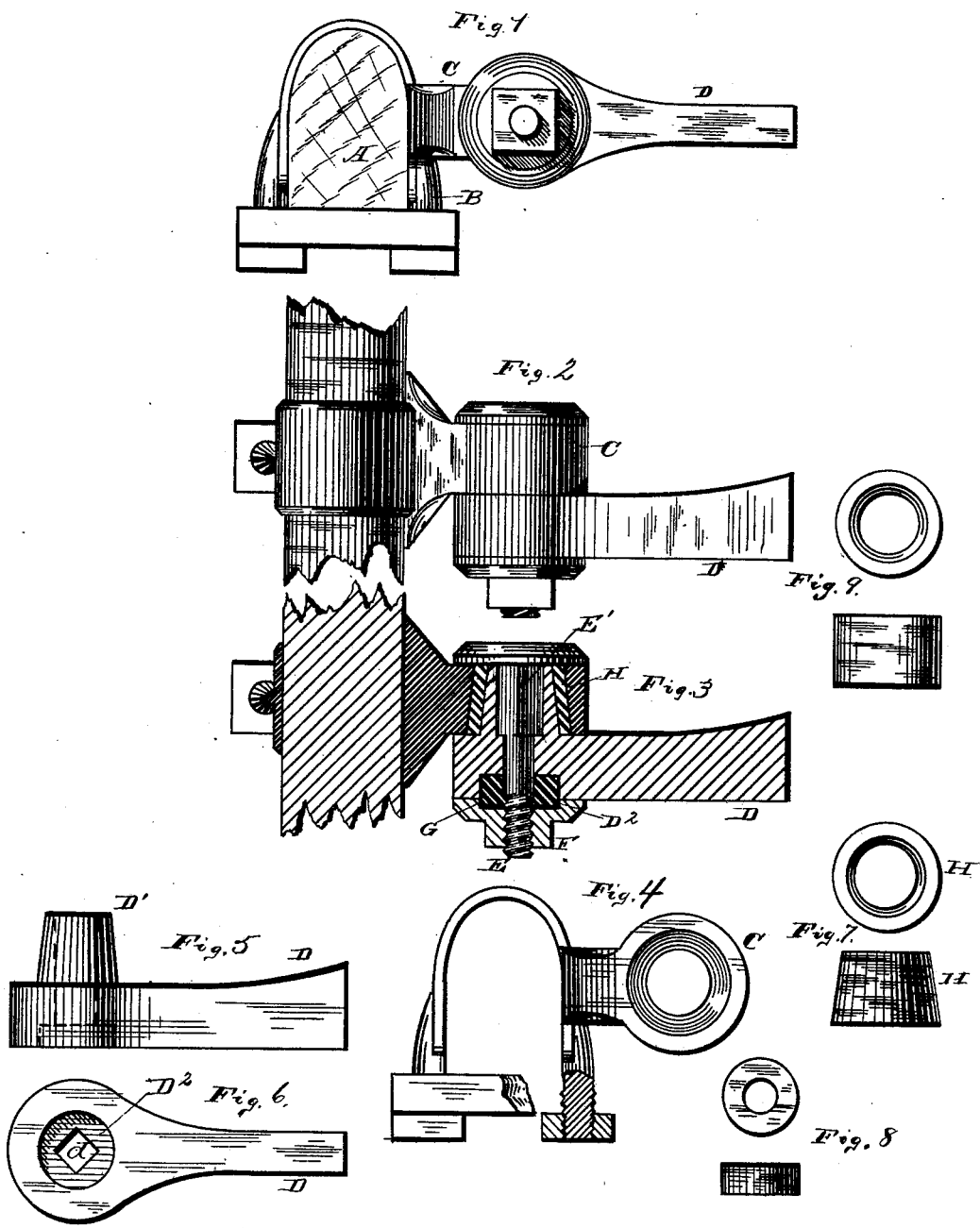
WITNESSES
INVENTOR

UNITED STATES PATENT OFFICE.

WILLIAM C. SHIPHERD, OF CLEVELAND, OHIO, ASSIGNOR OF ONE-HALF OF HIS RIGHT TO WM. D. FOLSOM, OF SAME PLACE.

THILL-COUPLING.

SPECIFICATION forming part of Letters Patent No. 231,455, dated August 24, 1880.

Application filed June 29, 1880. (No model.)

*To all whom it may concern:*

Be it known that I, WILLIAM C. SHIPHERD, of Cleveland, in the county of Cuyahoga and State of Ohio, have invented certain new and useful Improvements in Thill-Couplings; and I do hereby declare the following to be a full, clear, and exact description of the invention, such as will enable others skilled in the art to which it pertains to make and use it, reference being had to the accompanying drawings, which form part of this specification.

My invention relates to thill-couplings; and it consists of an improved construction and arrangement of the constituent parts, by which packing may be introduced in such a manner and at such points of the device as will prevent any noise whatever; also, so as to permit of an adjustment of the shackle, whereby any wear may be taken up.

The principal features of my device are a conoidal-shaped lug attached to the thill-iron, with a corresponding recess in the head attached to the clip; also, in a washer adapted to fit this lug attached to the thill-iron; also, in a washer introduced in a recess made to receive it underneath the nut, which holds the bolt by means of which the device is held together; also, in parts and combination of parts, as will more fully hereinafter appear.

In the drawings, Figure 1 is a view, in elevation, of a thill-coupling constructed according to my invention. Fig. 2 is a plan view of the same, and Fig. 3 is a transverse sectional view of the same. Fig. 4 is a detached view, in elevation, of that portion of my device attached to the clip. Fig. 5 is a plan view of that portion attached to the thill-iron. Fig. 6 is a view, in elevation, of the same. In Fig. 7 is shown, in plan and elevation, the washer adapted to fit the conoidal lug around the thill-iron. Fig. 8 is a view, in plan and elevation, of the washer adapted to take up the wear and keep the bolt which holds my device together from rattling. Fig. 9 is a modification, in plan and elevation, of the washer shown in Fig. 7.

In the drawings, A represents the axle; B, the clip; C, the lug, permanently attached to the clip, and provided with a conoidal-shaped recess, as shown in Fig. 4.

D represents the thill-iron. This thill-iron, as shown in Figs. 3 and 5, is provided with a conoidal-shaped lug or projection, D', upon one side, and upon the other is recessed, as shown in Figs. 3 and 6, at D², to receive a washer, and is also provided, through its whole width, with an angular opening, $d$, for the reception of the bolt E. This opening may be of any irregular shape, its object being to prevent the bolt, which should be of the same contour as the opening, from turning.

E is a bolt or pivot-pin, provided with a flat head. E' is an angular or irregularly-shaped portion contiguous to the head, and adapted to fit the opening $d$ in the thill-iron. At its other end, opposite its head, it is provided with a screw-thread adapted to receive the nut F. This nut F is countersunk upon its inner face to receive a portion of the washer G.

H is a conoidal-shaped washer, preferably made of rubber or leather, and adapted to fit over the lug D' and within the recess in the lug C. In Fig. 9 is shown a modification of this washer. It may be made cylindrical in form, with a conoidal opening adapted to receive the lug D'. If constructed in this manner, the opening in the lug C should be made in the same form and adapted to receive it. The object of this conoidal shape to the washer and lug, or to the lug D' alone, is to permit the ready detachment of the parts when the bolt is removed.

The office of the packing or washer G is to prevent lateral motion of the bolt E, and consequently preventing any noise arising from such motion.

To uncouple the thill-head the nut F is unscrewed from the bolt or pivot-pin E, when the bolt or pivot-pin may be readily removed and the thill-iron detached from the clip. To couple the thill-head the operation is reversed.

Having thus described the construction and operation of my device, what I claim is—

1. In a thill-coupling, the combination, with a lug, C, having a conoidal-shaped opening extending through the same, of thill-iron having a conoidal-shaped lug, D, a conoidal-shaped packing, H, and bolt having a head which extends over the packing H and prevents its displacement, substantially as set forth.

2. The combination, with the thill-iron D, having a recess formed therein, of the bolt E, recessed nut F, and elastic packing encircling the bolt and inserted in the recess in the thill-iron and recessed nut, substantially as set forth.

In testimony whereof I have signed my name to this specification in the presence of two subscribing witnesses.

WILLIAM C. SHIPHERD.

Witnesses:
   JNO. CROWELL, Jr.,
   W. E. DONNELLY.